(12) United States Patent
Atanassov et al.

(10) Patent No.: US 8,797,421 B2
(45) Date of Patent: Aug. 5, 2014

(54) SYSTEM AND METHOD TO SELECTIVELY COMBINE IMAGES

(71) Applicant: QUALCOMM Incorporated, San Diego, CA (US)

(72) Inventors: Kalin M. Atanassov, San Diego, CA (US); Hsiang-Tsun Li, San Diego, CA (US); Hau Hwang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/897,669

(22) Filed: May 20, 2013

(65) Prior Publication Data
US 2013/0251283 A1    Sep. 26, 2013

Related U.S. Application Data

(63) Continuation of application No. 12/340,522, filed on Dec. 19, 2008, now abandoned.

(51) Int. Cl.
*H04N 5/235* (2006.01)
*H04N 5/232* (2006.01)
*G06K 9/00* (2006.01)

(52) U.S. Cl.
USPC ............ 348/222.1; 348/208.14; 348/218.1; 382/103

(58) Field of Classification Search
USPC ............ 348/222.1, 208.14, 218.1; 382/103
See application file for complete search history.

(56) References Cited

U.S. PATENT DOCUMENTS

| | | | |
|---|---|---|---|
| 5,181,118 A | 1/1993 | Kimura | |
| 5,402,171 A | 3/1995 | Tagami et al. | |
| 5,450,502 A | 9/1995 | Eschbach et al. | |
| 5,519,441 A | 5/1996 | Gusmano et al. | |
| 5,647,360 A | 7/1997 | Bani-Hashemi et al. | |
| 5,690,106 A | 11/1997 | Bani-Hashemi et al. | |
| 5,801,773 A | 9/1998 | Ikeda | |
| 5,963,653 A | 10/1999 | McNary et al. | |
| 6,219,446 B1 | 4/2001 | Kiriki et al. | |
| 6,298,144 B1 | 10/2001 | Pucker, II et al. | |
| 6,416,477 B1 | 7/2002 | Jago | |

(Continued)

FOREIGN PATENT DOCUMENTS

| | | |
|---|---|---|
| CN | 1577396 A | 2/2005 |
| CN | 1799057 A | 7/2006 |

(Continued)

OTHER PUBLICATIONS

Bogoni L, et al., "Pattern-selective color image fusion" Pattern Recognition, Elsevier, GB LNKDDOI: 10.1016/S0031-3203(00)00087-X, vol. 34, No. 8, Aug. 1, 2001, pp. 1515-1526, XP004362563 ISSN: 0031-3203 figure 1 paragraphs [0002], [3.3], [3.4].

(Continued)

*Primary Examiner* — Joel Fosselman
(74) *Attorney, Agent, or Firm* — James R. Gambale, Jr.

(57) ABSTRACT

Systems and methods to selectively combine images are disclosed. In a particular embodiment, an apparatus includes a registration circuit configured to generate a set of motion vector data based on first image data corresponding to a first image and second image data corresponding to a second image. The apparatus includes a combination circuit to selectively combine the first image data and adjusted second image data that corresponds to the second image data adjusted according to the motion vector data. The apparatus further includes a control circuit to control the combination circuit to generate third image data.

20 Claims, 13 Drawing Sheets

(56) References Cited

U.S. PATENT DOCUMENTS

| | | |
|---|---|---|
| 6,813,040 B1 | 11/2004 | Uchino et al. |
| 6,879,731 B2 | 4/2005 | Kang et al. |
| 7,120,293 B2 | 10/2006 | Schoelkopf et al. |
| 7,133,070 B2 | 11/2006 | Wheeler et al. |
| 7,271,937 B2 | 9/2007 | Schrey et al. |
| 7,295,232 B2 | 11/2007 | Washisu |
| 7,315,325 B2 | 1/2008 | Soupliotis et al. |
| 8,339,475 B2 | 12/2012 | Atanassov et al. |
| 2005/0013501 A1 | 1/2005 | Kang et al. |
| 2005/0117799 A1 | 6/2005 | Fuh et al. |
| 2006/0133688 A1 | 6/2006 | Kang et al. |
| 2006/0192878 A1 | 8/2006 | Miyahara et al. |
| 2006/0274156 A1 | 12/2006 | Rabbani et al. |
| 2006/0275745 A1 | 12/2006 | Schwarz |
| 2007/0014480 A1 | 1/2007 | Sirohey et al. |
| 2007/0242900 A1 | 10/2007 | Chen et al. |
| 2007/0269132 A1 | 11/2007 | Duan et al. |
| 2008/0063294 A1 | 3/2008 | Burt et al. |
| 2008/0094486 A1 | 4/2008 | Fuh et al. |
| 2009/0102945 A1 | 4/2009 | Chen |
| 2009/0174795 A1 | 7/2009 | Kato et al. |
| 2010/0157078 A1 | 6/2010 | Atanassov et al. |
| 2010/0157079 A1 | 6/2010 | Atanassov et al. |

FOREIGN PATENT DOCUMENTS

| | | |
|---|---|---|
| CN | 1954344 A | 4/2007 |
| CN | 101072303 A | 11/2007 |
| EP | 1313066 A1 | 5/2003 |
| EP | 1507234 A1 | 2/2005 |
| EP | 1615169 A2 | 1/2006 |
| EP | 1857975 A2 | 11/2007 |
| JP | 2000050173 A | 2/2000 |
| JP | 2007028088 A | 2/2007 |
| JP | 2007310886 A | 11/2007 |
| JP | 2009505477 A | 2/2009 |
| KR | 20080009787 A | 1/2008 |
| KR | 20080097870 A | 11/2008 |
| TW | 200849978 A | 12/2008 |

OTHER PUBLICATIONS

Cvetkovic, et al., "Tone-mapping functions and multiple-exposure techniques for high dynamic-range images" IEEE Transactions on Consumer Electronics, IEEE Service Center, New York, NY, US, LNKD-DOI:10.1109/TCE.2008.4560177, vol. 54, No. 2, May 1, 2008, pp. 904-911, XP011229982.

International Search Report—PCT/US2009/068842—International Search Authority, European Patent Office, Mar. 24, 2010.

Larson, et al., "A Visibility Matching Tone Reproduction Operator for High Dynamic Range Scenes" IEEE Transactions on Visualization and Computer Graphics, IEEE Service Center, Los Alamitos, CA, US LNKD-DOI:10.1109/2945.646233, vol. 3, No. 4, Oct. 1, 1997, pp. 291-306, XP000730965.

Taiwan Search Report—TW098143694—TIPO—May 23, 2013.

Written Opinion—PCT/US2009/068842—ISA/EPO—Mar. 24, 2010.

Zhao, et al., "Automatic Digital Image Enhancement for Dark Pictures" Acoustics, Speech and Signal Processing, 2006. ICASSP 2006 Proceedings. 2006 IEEE International Conference on Toulouse, France May 14-19, 2006, Piscataway, NJ, USA, IEEE, Jan. 1, 2006, pp. II-953-II-956, XP031100762.

Chinese Doctoral Dissertations & Master's Thesis Full-text Database (Doctor), Basic Sciences, ISSN 1671-6779, May 15, 2006.

Lifang Zhang et al., "Dynamic Range Enhancement Using Multi-Exposed Images", Journal of Data Acquisition & Processing, Dec. 2007, vol. 22, No. 4, pp. 417-422.

SYSTEM AND METHOD TO SELECTIVELY COMBINE IMAGES

CROSS REFERENCE TO RELATED APPLICATIONS

This application is a continuation of U.S. patent application Ser. No. 12/340,522, filed Dec. 19, 2008, and entitled "SYSTEM AND METHOD TO SELECTIVELY COMBINE IMAGES," and assigned to the assignee of the present application. The disclosure of this prior application is incorporated herein by reference in its entirety.

I. FIELD

The present disclosure is generally related to a system and method to selectively combine images.

II. DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and internet protocol (IP) telephones, can communicate voice and data packets over wireless networks. Further, many such wireless telephones include other types of devices that are incorporated therein. For example, a wireless telephone can also include a digital still camera, a digital video camera, a digital recorder, and an audio file player. Such wireless telephones can process executable instructions, including software applications, such as a web browser application, that can be used to access the Internet. As such, these wireless telephones can include significant computing capabilities.

Digital signal processors (DSPs), image processors, and other processing devices are frequently used in portable personal computing devices that include digital cameras, or that display image or video data captured by a digital camera. Such processing devices can be utilized to provide video and audio functions, to process received data such as captured image data, or to perform other functions.

Captured image data may suffer from one or more issues such as shifting errors due to hand jitter, movement of objects in the image, overexposure, underexposure, poor focus in the near field or far field, lateral chromatic aberrations, and geometric distortions.

III. SUMMARY

Multiple images may be combined using a configurable image processing architecture that performs registration and combination of images to overcome issues that may occur in individual images. A control unit may adjust operation of a hierarchical image registration and a hierarchical image combination to enable various effects of combining the input image data. For example, a first two sets of image data may be combined for hand jitter reduction with reduced ghosting, a next two sets of image data may be combined to generate an enhanced depth of field image, and other sets of images may be combined to generate a high dynamic range image.

In a particular embodiment, a method is disclosed that includes receiving first image data corresponding to a first image and second image data corresponding to a second image. The method includes adjusting the second image data by applying a set of motion vector data corresponding to offsets between portions of the second image data with respect to corresponding portions of the first image data to produce adjusted second image data. The method further includes generating third image data by selectively combining first values from the first image data and second values from the adjusted second image data at least partially based on comparing a first characteristic of the first image data to a second characteristic of the second image data.

In another particular embodiment, a method is disclosed that includes determining a first set of motion vectors corresponding to an offset between each block of a first set of blocks of first image data and a corresponding block of a first set of blocks of second image data. The method also includes upsampling a motion vector of the first set of motion vectors corresponding to a particular block of the first set of blocks of the second image data to apply the motion vector to a second set of blocks of the second image data. The second set of blocks of the second image data are included within the particular block. The method also includes determining a second set of motion vectors corresponding to an offset between each of a second set of blocks of the first image data and a corresponding block of the second set of blocks of the second image data after applying the motion vector to the second set of blocks. The method also includes applying the second set of motion vectors to the second image data to generate adjusted second image data and selectively combining the first image data and the adjusted second image data.

In another particular embodiment, an apparatus is disclosed. The apparatus includes a registration circuit configured to generate a set of motion vector data based on first image data corresponding to a first image and second image data corresponding to a second image. The apparatus also includes a combination circuit to selectively combine the first image data and adjusted second image data. The adjusted second image data corresponds to the second image data that is adjusted according to the motion vector data. The apparatus further includes a control circuit to control the combination circuit to generate third image data.

In another particular embodiment, an apparatus is disclosed. The apparatus includes a registration means for generating a set of motion vector data based on first image data corresponding to a first image and second image data corresponding to a second image. The apparatus also includes a combination means for selectively combining the first image data and adjusted second image data. The adjusted second image data corresponds to the second image data that is adjusted according to the motion vector data. The apparatus further includes a control means for controlling the combination means to generate third image data.

One particular advantage provided by embodiments of the disclosed methods and apparatus is correction or improvement of issues associated with images such as shifting due to hand jitter, movement of objects in the image, overexposure, underexposure, poor focus in the near field or far field, lateral chromatic aberrations, and geometric distortions.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V DETAILED DESCRIPTION

Figure 1:
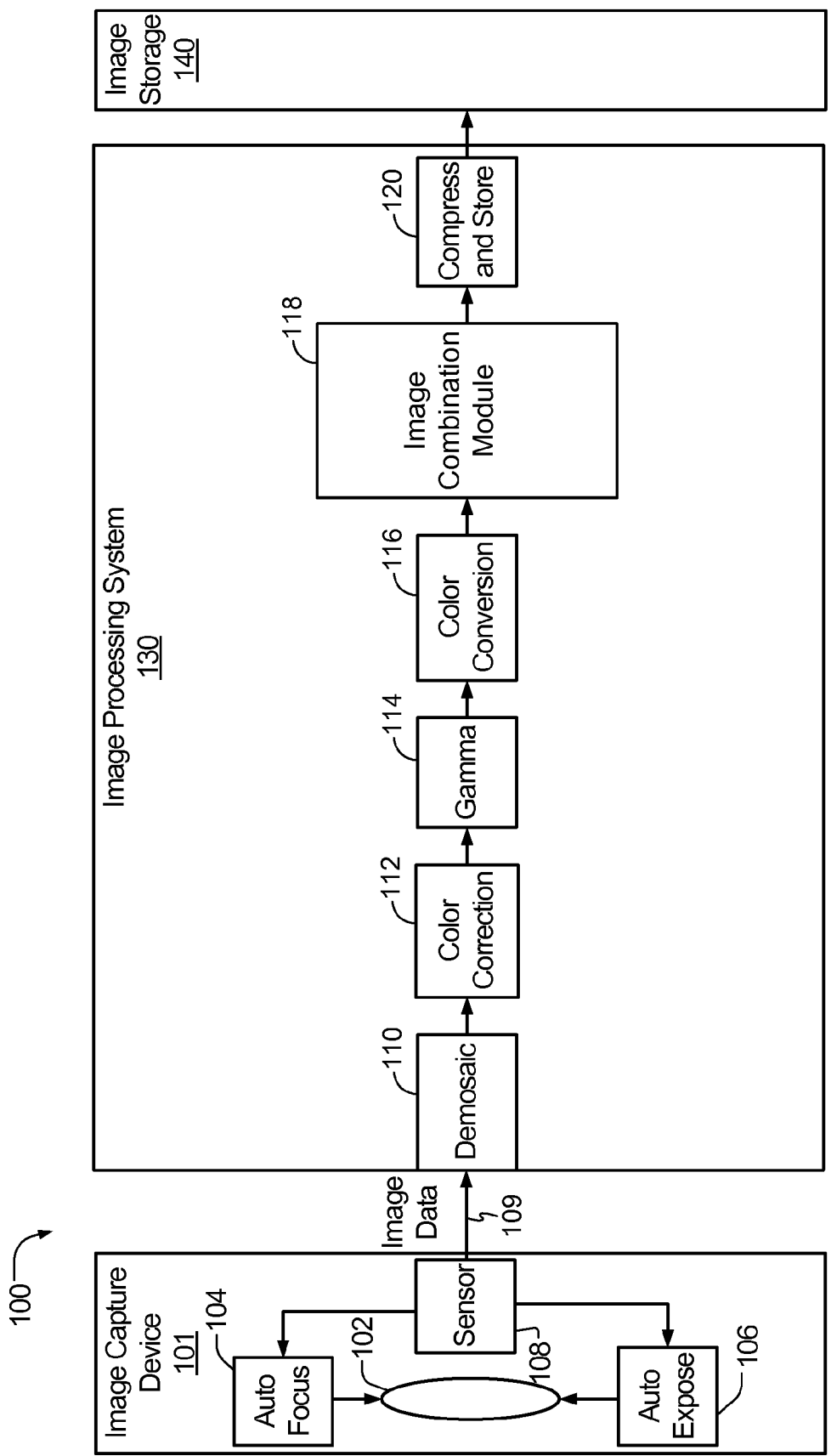
FIG. 1 is a block diagram of a particular illustrative embodiment of a system including an image processing system having an image combination module.

FIG. 1 is a block diagram of a particular illustrative embodiment of a system including an image processing system having an image combination module. The system 100 includes an image capture device 101 coupled to an image processing system 130. The image processing system 130 is coupled to an image storage device 140. The image processing system 130 is configured to receive image data 109 from the image capture device 101 and to combine multiple images providing correction or improvement of issues associated with the multiple images, such as shifting due to hand jitter, movement of objects in the image, overexposure, underexposure, poor focus in the near field or far field, lateral chromatic aberrations, and geometric distortions. Generally, the system 100 may be implemented in an electronic device that is configured to perform real-time image processing using relatively limited processing resources.

In a particular embodiment, the image capture device 101 is a camera, such as a video camera or a still camera. In other embodiments, the image capture device 101 may be a camera embodied in a cellular telephone, personal digital assistant (PDA) or the like. The image capture device 101 includes a lens 102 that is responsive to a focusing module 104 and to an exposure module 106. A sensor 108 is coupled to receive light via the lens 102 and to generate the image data 109 in response to an image received via the lens 102. The focusing module 104 may be responsive to the sensor 108 and may be adapted to automatically control focusing of the lens 102. The exposure module 106 may also be responsive to the sensor 108 and may be adapted to control an exposure of the image. In a particular embodiment, the sensor 108 includes multiple detectors, or pixel wells, that are arranged so that adjacent detectors detect different colors of light. For example, received light may be filtered so that each detector receives red, green, or blue incoming light.

The image capture device 101 is coupled to provide the image data 109 to the image processing system 130. The image processing system 130 includes a demosaic module 110 to perform a demosaic operation on image data 109 received from the image capture device 101. A color correction module 112 is configured to perform color correction on demosaiced image data. A gamma module 114 is configured to generate gamma corrected image data from data received from the color correction module 112. A color conversion module 116 is coupled to perform a color space conversion to the gamma corrected image data. The image processing system 130 also includes an image combination module 118 that is configured to combine multiple images, as is discussed with respect to FIGS. 2-14. A compress and store module 120 is coupled to receive an output of the image combination module 118 and to store compressed output data at the image storage device 140. The image storage device 140 may include any type of storage medium, such as one or more display buffers, registers, caches, flash memory elements, hard disks, any other storage device, or any combination thereof.

As was discussed, in a particular embodiment, the sensor 108 includes multiple detectors that detect different colors of light, such as red, green and blue (RGB). Thus, images may be received in the RGB color space. In a particular embodiment, the images may be converted to other color spaces such as the "YCbCr" color space by the color conversion module 116. The YCbCr color space is an example of a color space where images are represented by a luma (or brightness) component (the Y component in the YCbCr color space) and chroma components (the Cb and Cr components in the YCbCr color space.) In the YCbCr color space, Cb is blue minus luma (B-Y) and Cr is red minus luma (R-Y).

During operation, the image combination module 118 may correct or improve images corresponding to the input image data 109. For example, corrections or improvements may be made to images to compensate for issues associated with the captured images, such as shifting due to hand jitter, movement of objects in the image, overexposure, underexposure, poor focus in the near field or far field, lateral chromatic aberrations, and geometric distortions.

Although in the particular embodiment illustrated in FIG. 1 the image combination nodule 118 follows the color conversion module 116 in the image processing pipeline, in other embodiments the image combination module 118 may be implemented at other locations within the image processing pipeline. In addition, although the image capture device 102 is illustrated as having a single sensor 108, in other embodiments the image capture device 102 may have multiple sensors. For example, the image capture device 102 may have two or more sensors configured to perform multiple concurrent image captures of a particular scene under various conditions, such as using different exposure settings or different focus settings.

Figure 2:
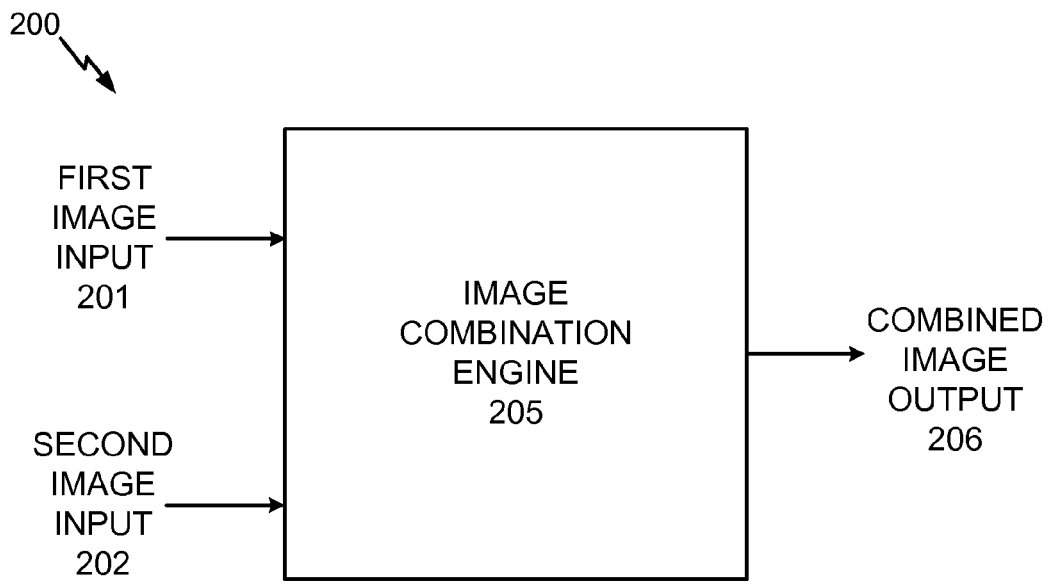
FIG. 2 is a block diagram illustrating a first embodiment of a system including an image combination engine.

FIG. 2 illustrates a system 200 having an image combination engine 205 with a first image input 201 to receive first image data corresponding to a first image. In a particular embodiment, the system 200 may be included in the image combination module 118 of FIG. 1. For example, a first image may be captured by the camera lens 102 and provided at the first image input 201 to the image combination engine 205 through the sensor 108, the demosaic module 110, the color correction module 112, the gamma module 114 and the color conversion module 116.

The image combination engine 205 further includes a second image input 202 to receive second image data corresponding to a second image. In a particular embodiment, the second image may be captured by the camera lens 102 and provided at the second image input 202 to the image combination engine 205 through the sensor 108, the demosaic module 110, the color correction module 112, the gamma module 114 and the color conversion module 116.

The first and second images are combined by the image combination engine 205. For example, the image combination engine 205 may operate according to embodiments described with respect to FIGS. 3-14.

The image combination engine 205 is configured to generate a combined image output 206. In a particular embodiment, the image combination engine 205 generates the combined image output 206 by selectively combining first values from the first image input 201 and adjusted second values from the second image input 202 at least partially based on comparing a first characteristic of a first image to a second characteristic of a second image. For example, when a region of the first image is out of focus but the corresponding region of the second image is in focus, the image combination engine 205 may select pixel values for the combined image output 206 corresponding to the region from the second image. Other examples of characteristics that may be compared include contrast of the images, deviations between the luminance components of the images, and filtered characteristics of the images (e.g. low-pass filtered data, high-pass filtered data). In a particular embodiment, the combined image output 206 may be coupled to an image storage device such as image storage device 140.

In other embodiments, the image combination engine 205 may include additional image inputs. In addition or alternatively, the combined image output 206 may be coupled to the first image input 201 providing for the ability to combine the output of the image combination engine 205 with additional image inputs received on the second image input 202 to iteratively combine the output image with additional input images. For example, three sets of image data may be combined to form a single image by applying a first set of image data to the first image input 201 and a second set of image data to the second image input 202, and by applying the resulting combined image to the first image input 201 and the third set of image data to the third image input 202, resulting in a combined image of all three sets of image data.

Figure 3:
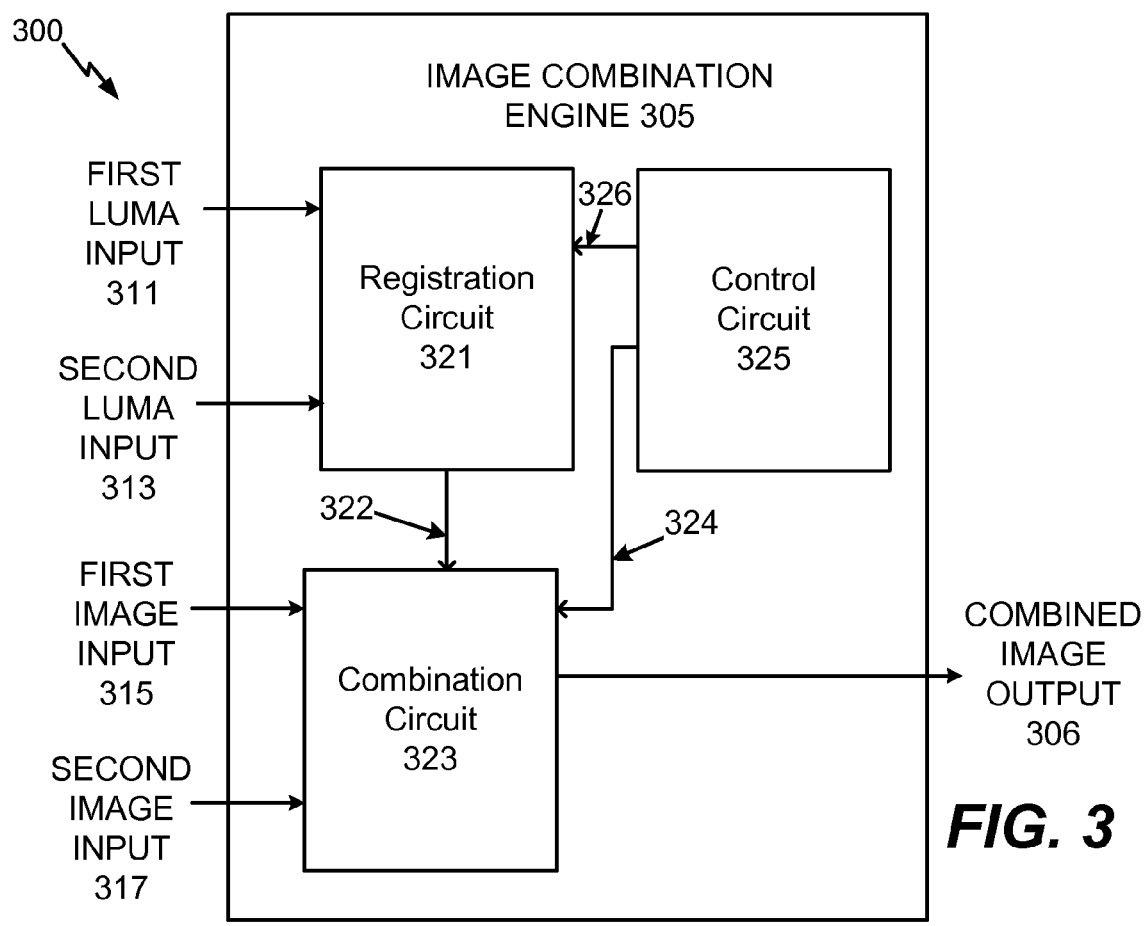
FIG. 3 is a block diagram illustrating a second embodiment of a system including an image combination engine.

FIG. 3 illustrates a system 300 having an image combination engine 305. In the system 300, the image combination engine 305 includes a registration circuit 321 which registers separate image inputs, a combination circuit 323 which combines separate image inputs, and a control circuit 325 that controls the registration circuit 321 and the combination circuit 323. In an illustrative embodiment, the system 300 may be included in the image combination module 118 of FIG. 1 or the image combination engine 205 of FIG. 2.

In a particular embodiment, the registration circuit 321 includes a first luma input 311, a second luma input 313, and an output 322 coupled to the combination circuit 323. The registration circuit 321 is configured to determine differences between data from the first luma input 311 and the second luma input 313 and to provide offset data to the combination circuit 323 at the output 322. In a particular embodiment, the first luma input 311 is the Y component data for a first image coded in the YCbCr color space and the second luma input 313 is the Y component data for a second image coded in the YCbCr color space. As illustrated in FIG. 3, the registration circuit 321 performs image registration using only the luma components from the images to be registered. In other embodiments, the registration circuit 321 may use other components of the image data in addition to, or in place of, the luma component to perform registration.

The combination circuit 323 includes a first image input 315, a second image input 317, an input to accept registration data from the registration circuit 321 and a combined image output 306. In a particular embodiment, the first image input 315 receives data for a first image coded in the YCbCr color space and the second image input 317 receives data for a second image coded in the YCbCr color space. The combination circuit 323 is configured to selectively combine a first image and a second image that has been adjusted based on differences detected by the registration circuit 321 (i.e., adjusted to align with the first image data). The registration circuit 321 is configured to be responsive to the input 326 to operate under control of the control circuit 325 and the combination circuit 323 is configured to be responsive to the input 324 to operate under control of the control circuit 325.

In a particular embodiment, the image combination circuit 323 generates the combined image output 306 by selectively combining first values from the first image input 315 and second values from the second image input 317 at least partially based on comparing a first characteristic of a first image to a second characteristic of a second image. The characteristics may include focus, contrast, variance, or frequency spectrum, as illustrative examples. For example, the image combination circuit 323 may combine regions of the first image input 315 and the second image input 317 based on which image input has better focus in the region, which image input has better contrast in the region, how much variance is detected between the two image inputs in the region after the registration, or other characteristics to improve a quality of the combined image output 306. The image combination circuit 323 may receive input 324 from the control circuit 325 indicating selected characteristics, evaluate the respective images on a region-by-region or even pixel-by-pixel basis, and generate the combined image based on a selective combination of regions or pixels of the input images based on the evaluated characteristics.

Figure 4:
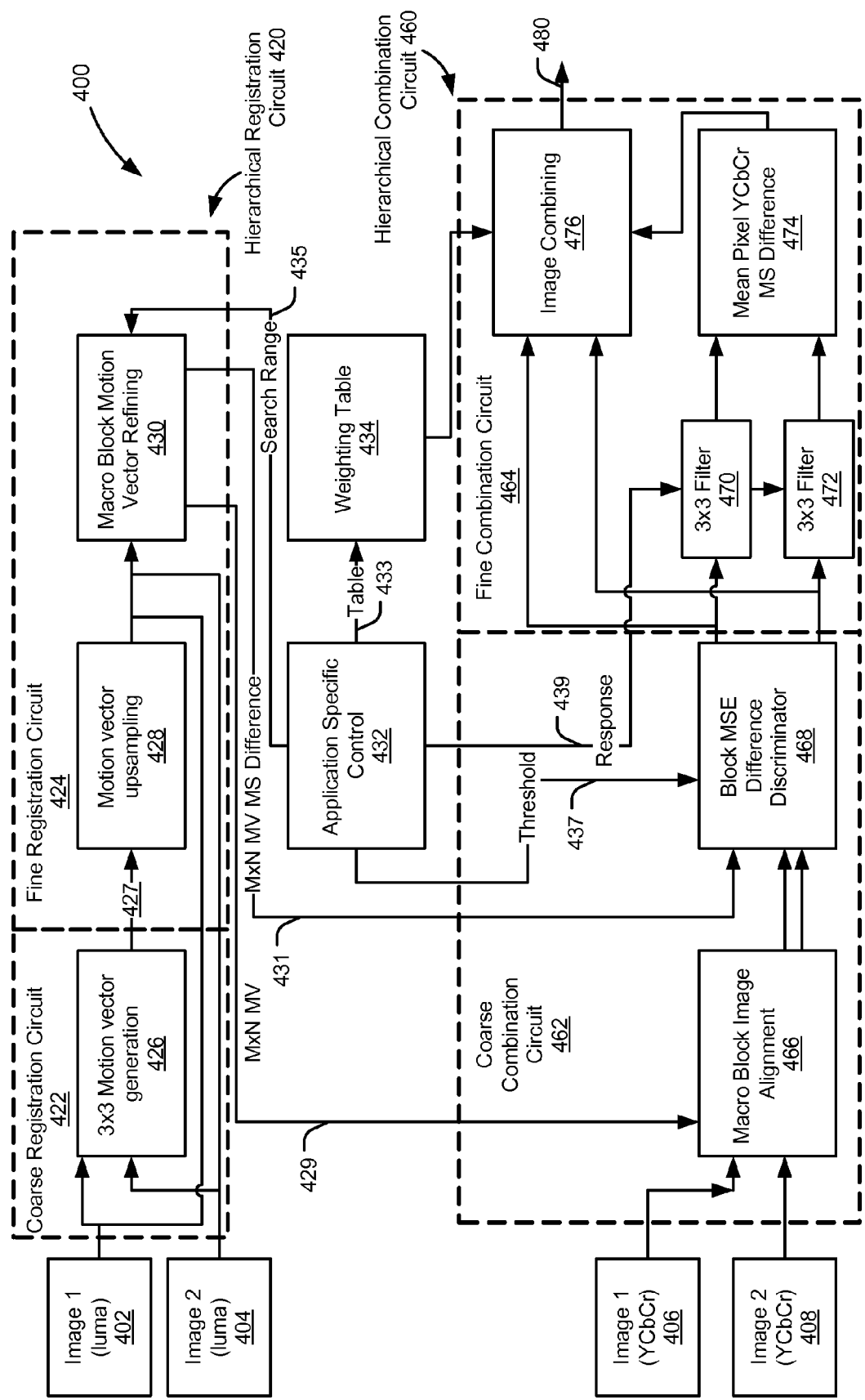
FIG. 4 is a block diagram illustrating a embodiment of a system including an image combination circuit.

Referring to FIG. 4, a system to selectively combine multiple images is depicted and generally designated 400. In a particular embodiment, the system 400 may be included in the image combination module 118 of FIG. 1, the image combination engine 205 of FIG. 2, the image combination engine 305 of FIG. 3, or any combination thereof. The system 400 includes a hierarchical registration circuit 420 that is coupled to a hierarchical combination circuit 460. The hierarchical registration circuit 420 and the hierarchical combination circuit 460 are coupled to an application specific control circuit 432. The application specific control circuit 432 and the hierarchical combination circuit 460 are also coupled to a weighting table 434.

The hierarchical registration circuit 420 is configured to receive first image luma data 402 corresponding to a first image and second image luma data 404 corresponding to a second image and to perform a registration process on the first image luma data 402 and the second image luma data 404 using a coarse registration circuit 422 and a fine registration circuit 424. The hierarchical registration circuit 420 is configured to generate a fine set of motion vectors 429 that indicate detected offsets between corresponding portions of the first image luma data 402 and the second image luma data 404. In a particular embodiment, the fine set of motion vectors 429 include magnitude and direction data to align images that may be misaligned due to camera movement, image movement, or both. As illustrated, the hierarchical registration circuit 420 operates on image luma data for computational efficiency. However, in other embodiments, the hierarchical registration circuit 420 may operate using other types of image data, such as chroma component data, red data, blue data, or green data, or any combination thereof, in addition to or in place of luma data.

In a particular embodiment, the coarse registration circuit 422 includes a motion vector generation circuit 426. The motion vector generation circuit 426 may be configured to partition each of the first image luma data 402 and the second image luma data 404 into blocks to perform a coarse registration process between the blocks. For example, the motion vector generation circuit 426 may logically divide each of the first image luma data 402 and the second image luma data 404 into a 3×3 set of overlapping blocks and may use a projection of the overlapping blocks to generate a coarse set of motion vectors 427 that can be applied to align each of the blocks of the second image luma data 404 to a corresponding block of the first image luma data 402. In other embodiments, any number of blocks may be used, and some or all of the blocks may be non-overlapping blocks.

The fine registration circuit 424 is configured to receive the coarse set of motion vectors 427 and to generate a fine set of motion vectors 429. In a particular embodiment, the fine registration circuit 424 includes a motion vector upsampling circuit 428 coupled to a macro block refining circuit 430. The motion vector upsampling circuit 428 may receive and upsample the coarse set of motion vectors 427 to generate motion vectors having a finer granularity than the coarse set of motion vectors 427. To illustrate, the image luma data 402 and 404 may be configured as M×N arrays of macro blocks, where each macro block corresponds to a sixteen-pixel-by-sixteen-pixel region of an image. The motion vector upsampling circuit 428 may generate a M×N set of motion vectors that applies the corresponding motion vector of the coarse set of motion vectors 427 to each macro block.

In a particular embodiment, the macro block motion vector refining circuit 430 is coupled to receive the upsampled set of motion vectors 427 and the image luma data 402 and 404 and to generate a refined set of motion vectors 429. For example, the macro block motion vector refining circuit 430 may be configured to apply each motion vector of the upsampled set of motion vectors 427 to its corresponding macro block of the second image data to coarsely align the macro block of the second image data with a corresponding macro block of the first image data. The macro block motion vector refining circuit 430 may search a region of the first image data 402 around the coarsely aligned macro block to determine a more accurate alignment of the coarsely aligned macro block to the first image data 402. The search region may be selected based on a search range control signal 435 received from the application specific control circuit 432. The refined set of motion vectors 429 may indicate vector data corresponding to the more accurate alignment of each macro block to enable a macro block-by-macro block registration of the first image luma data 402 and the second image luma data 404.

The macro block motion vector refining circuit 430 may determine the refined set of motion vectors 429 by performing an algorithm that selects a lowest calculated mean square error (MSE) or other norm among multiple possible MSEs for each motion vector. For example, for a particular macro block of the second image luma data 404, multiple possible alignments of the macro block with the first image luma data 402 may be considered, and the alignment that results in a lowest computed MSE is selected for the refined set of motion vectors 429. The mean square error determined for each macroblock may be provided to the hierarchical combination circuit 460 as motion vector (MV) means square difference data 431.

In a particular embodiment, the hierarchical combination circuit 460 is configured to combine first image data 406 and second image data 408 using a coarse combination circuit 462 and a fine combination circuit 464. The first image data 406 may include the first luma data 402 for the first image and also includes chroma data for the first image as YCbCr image data. The second image data 408 may include the second luma data 404 for the second image and chroma data for the second image as YCbCr data.

In a particular embodiment, the coarse combination circuit 462 includes a macro block image alignment circuit 466 and a block MSE difference discriminator circuit 468. The macro block image alignment circuit 466 may be configured to apply the refined set of motion vectors 429 to the second image data 408 to generate image data for the second image that is aligned to the first image data. For example, the macro block image alignment circuit 466 may be configured to combine pixel values in the second image when macro blocks are determined to overlap, or to interpolate pixel values where macro blocks are realigned to result in a region of the second image data that is not within any macro blocks. The macro block image alignment circuit 466 may provide the first image data 406 and the aligned image data for the second image to the block MSE difference discriminator circuit 468.

In a particular embodiment, the block MSE difference discriminator circuit 468 is configured to perform a coarse combination process on the data received from the macro block image alignment circuit 466. In particular, the block MSE difference discriminator circuit 468 may eliminate macro blocks of the aligned image data for the second image that do not sufficiently match the first image data 406. For example, the MV MS difference data 431 for each macro block may be compared against a threshold value. When the MS difference exceeds the threshold value for a particular macro block, the particular macro block is determined to be too different between the first image data 406 and the aligned image data for the second image, and thus the image data should not be combined for the particular macro block.

For example, where a moving object appears in a first macro block in the first image data 406 (but not in the first macro block in the aligned image data for the second image) and the moving object appears in a second macro block in the aligned image data for the second image (but not in the second macro block of the first image data 406), the first macro block may be determined to be non-combinable between the first and second images, and the second macro block may determined to be non-combinable between the first and second images, due to the corresponding mean square error differences. The block MSE difference discriminator circuit 468 may be configured to remove each non-combinable macro block from the aligned second image data so that only the pixel values for the macro block from the first image data 406 are used. For example, the pixel values for the macro block may be copied from the first image data 406 to replace the pixel values in the corresponding macroblock of the aligned image data for the second image.

As illustrated, the block MSE difference discriminator circuit 468 is responsive to the application specific control circuit 432. For example, the application specific control circuit 432 may provide a threshold control signal 437 that indicates a threshold difference to be used to compare MSE differences between macroblocks of the first image data and the aligned image data for the second image. The block MSE difference discriminator circuit 468 may output two sets of image data to the fine combination circuit 464, including image data corresponding to the first image and image data corresponding to the second image following the coarse combination process.

The fine combination circuit 464 is configured to receive first and second image data that has been registered and coarsely aligned, and to perform a fine combination process to generate output image data 480. In a particular embodiment, the fine combination circuit 464 includes a first filter 470 and a second filter 472 coupled to a mean pixel MS difference circuit 474. The fine combination circuit 464 also includes an image combining circuit 476 coupled to the mean pixel MS difference circuit 474 and to the weighting table 434.

The received data for the first image may be processed by the first filter 470, and the filtered data for the first image is provided to the mean pixel MS difference circuit 474. The received data for the second image may be processed by the second filter 472, and the filtered data for the second image is provided to the mean pixel MS difference circuit 474. The filters 470 and 472 may be responsive to the application specific control circuit 432. For example, the filters 470 and 472 may receive a response control signal 439 from the application specific control circuit 432 that indicates a filter response characteristic, such as a low-pass response, a high-pass response, a bandpass response, any other filter response, or any combination thereof. The filters 470 and 472 may include a 3×3 kernel, or any other size kernel. In a particular embodiment, the filters 470 and 472 have a kernel size responsive to the application specific control circuit 432.

The mean pixel MS difference circuit 474 may be configured to receive the filtered data corresponding to each image and to perform a pixel-by-pixel signed mean square difference operation. The difference operation may generate a signed value indicating a difference between the filtered data of the first image and the filtered data of the second image, for each particular pixel, using each of the luma and chroma values for the particular pixel. The mean pixel MS difference circuit 474 may be configured to provide the difference data to the image combining circuit 476 as a mean pixel difference result.

The image combining circuit 476 may be configured to receive, for each pixel, a difference value from the mean pixel MS difference circuit 474 and to determine a pixel value of each pixel in the output image data 480. For example, the received difference value for a particular pixel may be provided as a lookup operation at the weighting table 434. A result of the lookup operation may determine whether the pixel value in the output image data 480 has a value from the first image data received from the coarse combination circuit 462, a value from the second image data received from the coarse combination circuit 462, or a combination thereof.

The weighting table 434 may include data indicating a first weight to be applied to a pixel value of the first image data and a second weight to be applied to a pixel value of the second image data. The weighting table 434 may provide an output value "W" having a range of approximately 0 to 1 that corresponds to a weight to be applied to the first image data, and a value 1−W that corresponds to a weight to be applied to the second image data. The weighting table may be responsive to a table control signal 433 from the application specific control circuit 432.

During operation, the application specific control circuit 432 may determine one or more control parameters to control an image registration and combination process at the system 400. For example, the application specific control circuit 432 may select a value of the search range control signal 435 to indicate an aggressiveness of the macro block registration, the threshold control signal 433 to indicate an amount of acceptable difference for macroblock combination, the response control signal 439 to indicate a type of filtering to be performed, and the table control signal 433 to indicate a weighting of how the images are to be combined based on a filtered pixel difference between the images.

Although the system 400 is illustrated as including hardware circuits configured to perform specific processes, in other embodiments one or more components of the system 400 may be performed by a processor executing processor instructions. For example, one or more of the functions performed by the circuits 420, 422, 424, 426, 428, 430, 432, 434, 460, 462, 464, 466, 468, 470, 474, or 476 may be performed by an image processor, digital signal processor (DSP), or general purpose processor that has been programmed to perform one or more of the functions or general algorithms described above. In other embodiments, one or more of the circuits 420, 422, 424, 426, 428, 430, 432, 434, 460, 462, 464, 466, 468, 470, 474, or 476 may be replaced by components included in hardware, firmware, a processor executing computer readable instructions, or any combination thereof.

Particular embodiments illustrating image combining are discussed in connection with FIGS. 5-11 and are useful for understanding operation of the image combination circuit 400 of FIG. 4 as may be implemented in these particular embodiments.

Figure 5:
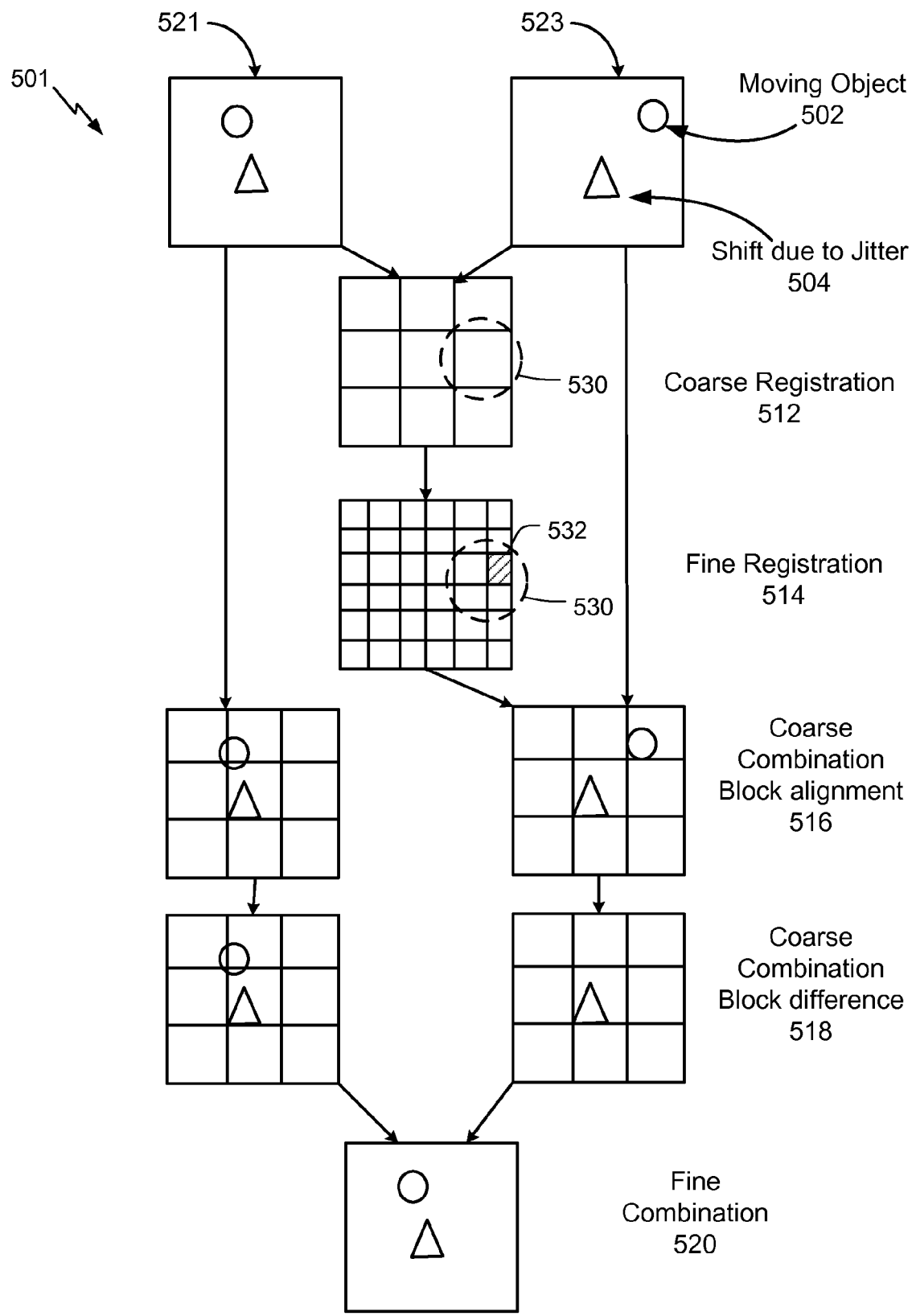
FIG. 5 is a diagram logically illustrating operation of an embodiment of an image combination engine providing for correction of hand jitter and for reducing object blur due to moving objects.

Referring to FIG. 5, a diagram is provided logically illustrating operation of an embodiment of an image combination engine providing for correction of hand jitter and reducing object blur due to moving objects. For purposes of illustration in FIG. 5, a moving object 502 is represented by a circle and a portion of an image shifted due to jitter 504 is illustrated by a triangle. A first column 521 generally represents a processing path of a first image and a second column 523 generally represents a processing path of a second image.

In an illustrative embodiment, the data flow 501 of the first and second images to remove hand jitter may be performed in the image combination module 118 of FIG. 1, the image combination engine 205 of FIG. 2, the image combination engine 305 of FIG. 3, the image combination circuit 400 of FIG. 4, or any combination thereof. In a second illustrative embodiment, the data flow 501 of the first and second images to remove hand jitter may be performed in accordance with the method of selective combination of images 1200 of FIG. 12, the hierarchical registration process 1300 of FIG. 13, the image improvement process 1400 of FIG. 14, or any combination thereof.

Initially, the first image and the second image are provided as inputs to a coarse registration process resulting in a coarse registration 512 and a fine registration process resulting in a fine registration 514. The coarse registration process and the fine registration process are configured to determine differences between the first image and the second image. As illustrated, the coarse registration 512 may subdivide each set of image data into portions such as a first portion 530 and may determine an offset between the first portion of the first image and the first portion of the second image. The fine registration 514 may further subdivide each portion, such as into macroblocks that correspond to sixteen-pixel-by-sixteen-pixel areas of the images, illustrated as a second portion 532 that is within the first portion 530. The fine registration 516 may determine an offset between the second portion of the first image and the second portion of the second image, and may represent the offset via a motion vector, such as a motion vector of the fine set of motion vectors 429 of FIG. 4.

Blocks of the second image are aligned with blocks of the first image based on the registration of the images to produce a coarse combination block alignment 516.

A coarse combination block difference process detects the moving object 502 (represented by the circle) based on the number of pixels the object 502 shifted between the first image and the second image to produce a coarse combination block difference 518. The number of pixels an object must shift before it is considered to be a moving object may vary from application to application and, in certain embodiments, is controlled by an application-specific registration control module, such as the application specific registration control module 431 of FIG. 4 or the control circuit 325 of FIG. 3. After the moving object is detected, the moving object is removed from the second image by replacing the block with the moving object in the second image with the corresponding block of the first image, which may substantially reduce "ghosting" due to moving objects when combining images. The shift due to hand jitter 504, illustrated as the triangle, is adjusted by the coarse registration process and the fine registration process so that the images can be combined on a pixel-by-pixel basis. For example, the fine combination process may average values of the first and second registered images for reduced image error and reduced noise. A resulting combined image provides correction or improvement of issues associated with the images such as shifting due to hand jitter and ghosting due to movement of objects in the image, with less noise than either of the first or second image data.

As an illustrative, non-limiting example the data flow 501 may be performed at the system 400 of FIG. 4 in a hand jitter reduction with object blur reduction mode controlled by the application specific control circuit (ASCC) 432. The ASCC 432 may instruct the hierarchical registration circuit 420 to use a large search range to detect object motion via the search range control signal 435. The ASCC 432 may instruct the coarse combination circuit 462 via the threshold signal 437 to not combine blocks that are far off from each other, such as by setting the threshold according to a largest expected or measured noise value plus a predetermined margin. The ASCC 432 may configure the filters 470 and 472 of the fine combination circuit 464 via the response signal 439 to operate in an all-pass mode for each plane (e.g., Y, Cb, and Cr) to enable comparison based on the filtered image characteristics. The ASCC 432 may configure the weighting table 434 via the table signal 433 to provide a weighting function that causes the fine combination circuit 464 to generate a pixel value of the output image data 480 using an average of the pixel's value in the first image data and the second image data received from the coarse combination circuit 462 when the magnitude of the mean pixel MS difference of the filtered image data is less than a selected amount, and to use only the pixel's value in the first image data otherwise.

Figure 6:
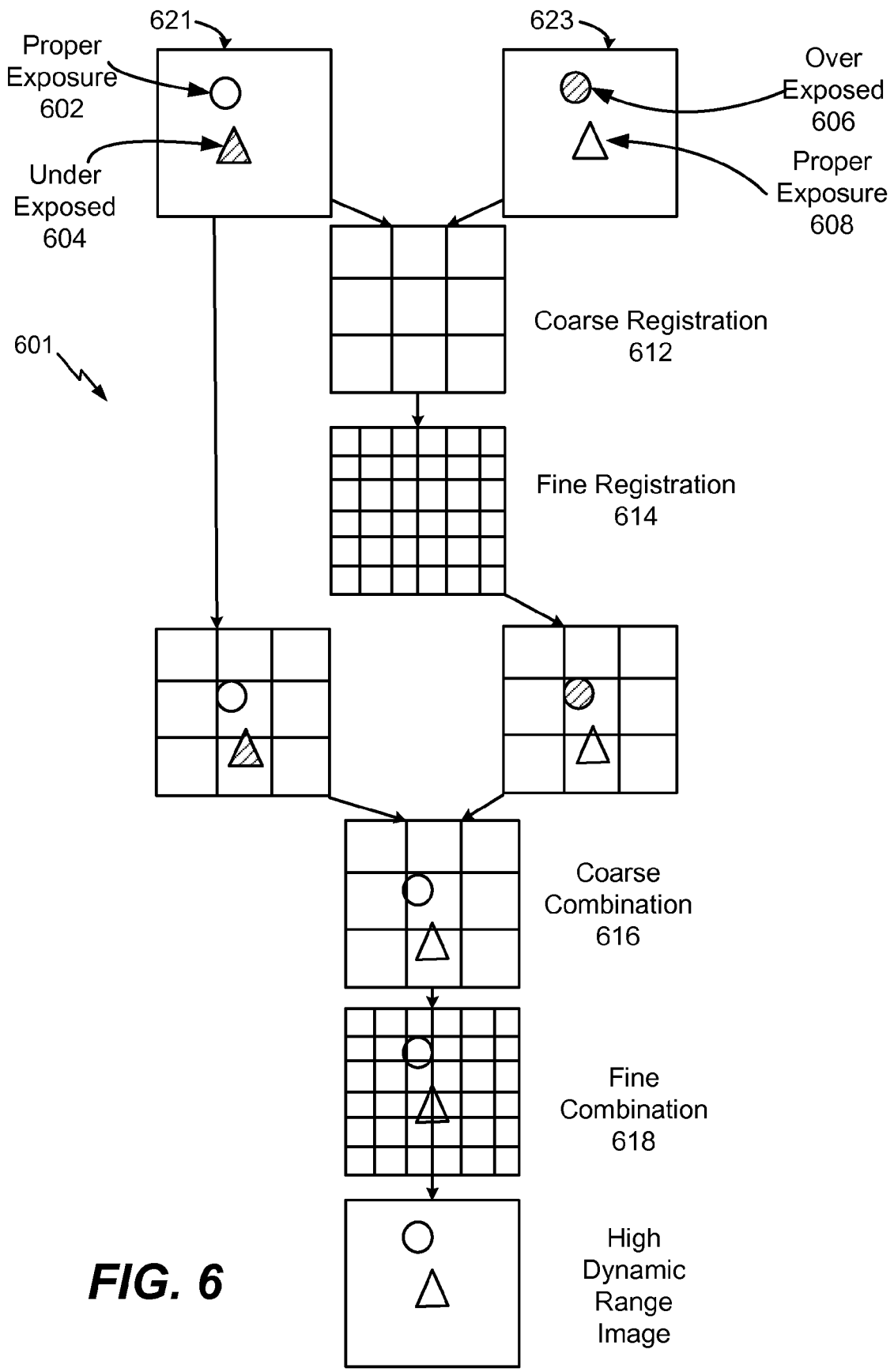
FIG. 6 is a diagram logically illustrating operation of an embodiment of an image combination engine to generate a high dynamic range image.

Referring to FIG. 6, a diagram is shown logically illustrating operation of an embodiment of an image combination to generate a high dynamic range image. A first column 621 represents a processing path of an image taken with a relatively short exposure time resulting in part of the image being properly exposed and represented as a proper exposure portion 602 and part of the image being under-exposed and represented as an under-exposed portion 604. A second column 623 represents a processing path of an image taken with a relatively long exposure time resulting in part of the image being over-exposed represented as an over-exposed portion 606 and part of the image being properly exposed and represented as a properly exposed portion 608.

In an illustrative embodiment, the data flow 601 of the first and second images to provide a high dynamic range (HDR) image may be performed in the image combination module 118 of FIG. 1, the image combination engine 205 of FIG. 2, the image combination engine 305 of FIG. 3, the image combination circuit 400 of FIG. 4, or any combination thereof. In a second illustrative embodiment, the data flow 601 of the first and second images to provide a HDR image may be performed in accordance with the method of selective combination of images 1200 of FIG. 12, the hierarchical registration process 1300 of FIG. 13, the image improvement process 1400 of FIG. 14, or any combination thereof.

Initially, the first image in the first processing path 621 and the second image in the second processing path 623 are provided as inputs to a coarse registration process that provides a coarse registration 612 and a fine registration process that provides a fine registration 614. The coarse registration process and the fine registration process determine differences between the first image and the second image.

Blocks of the second image are aligned with blocks of the first image based on the registration of the images to produce a coarse combination 616. The coarse combination 616 further has blocks of the registered images removed that do not adequately match, such as due to object motion in the image, as described in FIG. 5.

A fine combination process combines the proper exposure portion 602 of the first image with the proper exposure portion 608 of second image, on a pixel-by-pixel basis, resulting in a fine combination having a properly exposed HDR image. In certain embodiments, other image enhancement functions may be carried out using the fine combination process.

As an illustrative, non-limiting example the data flow 601 may be performed at the system 400 of FIG. 4 in a high dynamic range mode controlled by the application specific control circuit (ASCC) 432. The ASCC 432 may instruct the hierarchical registration circuit 420 via the search range control signal 435 to not rely on fine motion vector estimation, such as to use a very small or zero search range. The ASCC 432 may instruct the coarse combination circuit 462 via the threshold signal 437 to use a very high threshold or to disable discarding blocks. The ASCC 432 may configure the filters 470 and 472 of the fine combination circuit 464 via the response signal 439 to set a luma filter for the reference image to average and everything else to zero to enable comparison based on the filtered image characteristics. The ASCC 432 may configure the weighting table 434 via the table signal 433 to provide a weighting function that causes the fine combination circuit 464 to generate a pixel value of the output image data 480 using the pixel's value in the first image data when the mean pixel MS difference of the filtered image data is less than a first amount, using the pixel's value in the second image data when the mean pixel MS difference of the filtered image data is greater than a second amount, and a smooth transition to an average of the pixel's value in the first image data and the second image data received from the coarse combination circuit 462 when the magnitude of the mean pixel MS difference of the filtered image data is between the first amount and the second amount.

Figure 7:
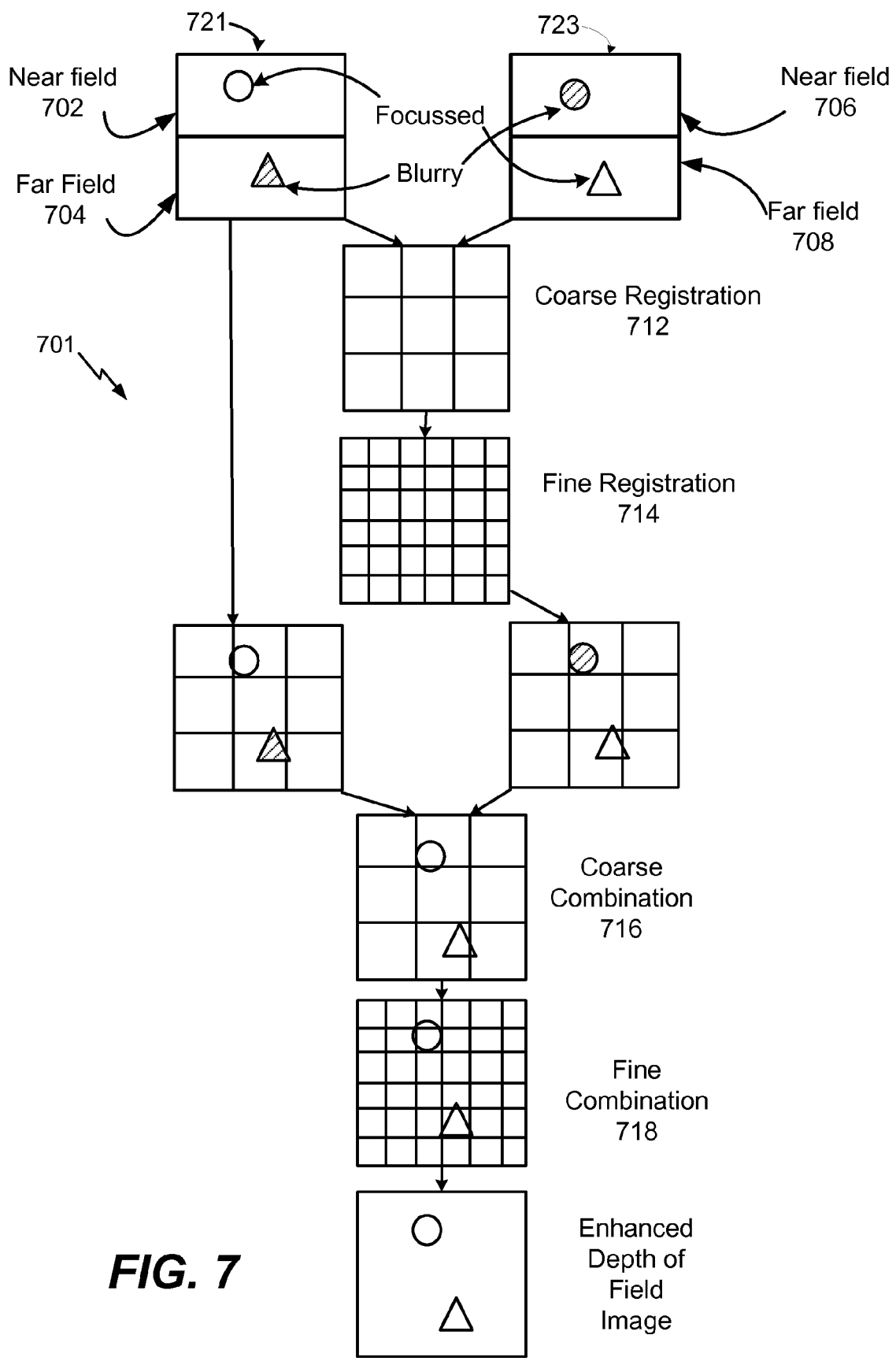
FIG. 7 is a diagram logically illustrating operation of an embodiment of an image combination engine providing for depth of field enhancement.

FIG. 7 is a diagram logically illustrating operation of an embodiment of an image combination engine providing for depth of field enhancement. As illustrated by FIG. 7, a first image in a first processing path 721 includes a near field portion 702 which is focused and a far field portion 704 which is blurry. A second image in a second processing path 723 includes a near field portion 706 which is blurry and a far field portion 708 which is focused.

In an illustrative embodiment, the data flow 701 of the first and second images to provide depth of field enhancement may be performed in the image combination module 118 of FIG. 1, the image combination engine 205 of FIG. 2, the image combination engine 305 of FIG. 3, the image combination circuit 400 of FIG. 4, or any combination thereof. In a second illustrative embodiment, the data flow 701 of the first and second images to provide depth of field enhancement may be performed in accordance with the method of selective combination of images 1200 of FIG. 12, the hierarchical registration process 1300 of FIG. 13, the image improvement process 1400 of FIG. 14, or any combination thereof.

Initially, the first image and the second image are provided as inputs to a coarse registration process producing a coarse registration image 712 and a fine registration process producing a fine registration image 714. The coarse registration image 712 and the fine registration image 714 are configured to determine differences between the first image and the second image. After registration, blocks of the second image are aligned with blocks of the first image based on the registration of the images by the coarse combination process to produce a coarse combination image 716. The coarse combination process further removes non-matching blocks due to moving objects in one of the registered images.

A fine combination process combines the focused near field portion 702 of the first image with the focused far field portion 708 of the second image on a pixel-by-pixel basis resulting in a focused combined image to produce a fine combination image 718. In certain embodiments, other image enhancement functions may be carried out using the fine combination process. An image with an enhanced depth of field is provided.

As an illustrative, non-limiting example the data flow 701 may be performed at the system 400 of FIG. 4 in an enhanced depth of field mode controlled by the application specific control circuit (ASCC) 432. The ASCC 432 may instruct the hierarchical registration circuit 420 via the search range control signal 435 to use a large search range to enable object move detection. The ASCC 432 may instruct the coarse combination circuit 462 via the threshold signal 437 to not combine blocks that are far off from each other, such as by setting the threshold according to a largest expected or measured noise value plus a predetermined margin. The ASCC 432 may configure the filters 470 and 472 of the fine combination circuit 464 via the response signal 439 to have a high pass filter response for luma data and zero for chroma data to enable comparison based on the filtered image characteristics. The ASCC 432 may configure the weighting table 434 via the table signal 433 to provide a weighting function that causes the fine combination circuit 464 to generate a pixel value of the output image data 480 using the pixel's value in the first image data when the mean pixel MS difference of the filtered image data is less than zero, and transitioning to use the pixel's value in the second image data when the mean pixel MS difference of the filtered image data is greater than zero.

Figure 8:
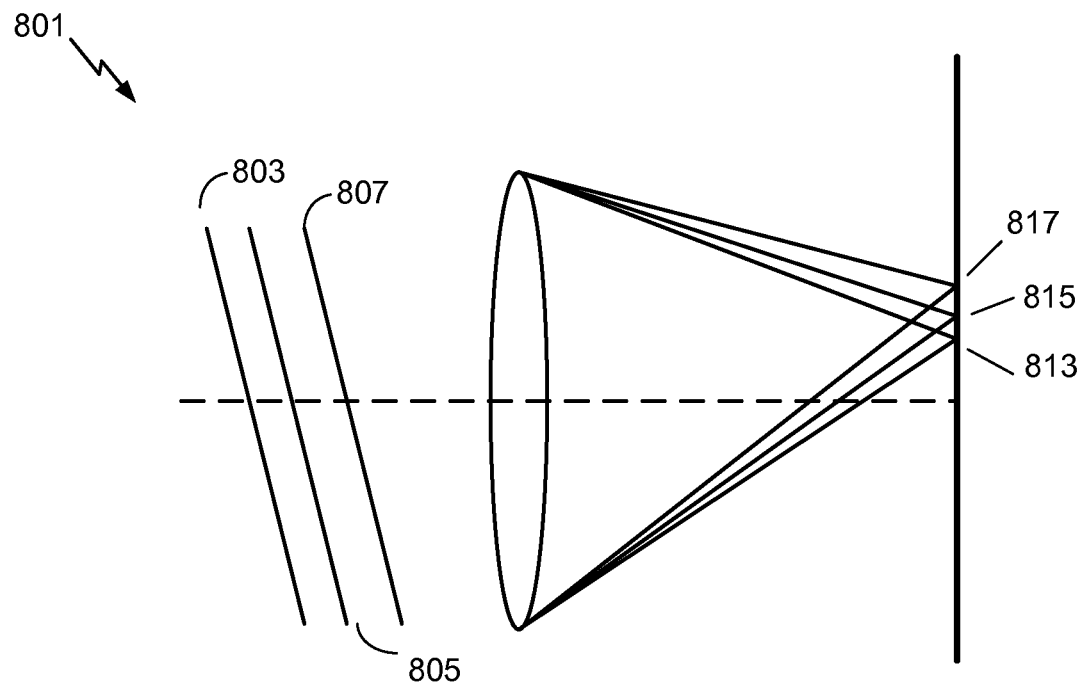
FIG. 8 illustrates lateral chromatic aberrations.

Turning to FIG. 8, lateral chromatic aberrations are illustrated. As illustrated by FIG. 8, incoming light is depicted as planes 803, 805 and 807 incident on a lens. Due to refractive properties of the lens, each detected color of the incident light may have a slightly different field of view, illustrated as fields of view 813, 815 and 817, respectively, as received at a sensor array. In a particular embodiment, registration of the three color planes generated using a sensor output, such as red, green, and blue color planes, can compensate for the different fields of view.

Figure 9:
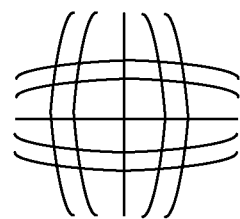
FIG. 9 illustrates a first embodiment of geometric distortions of an image.
Figure 10:
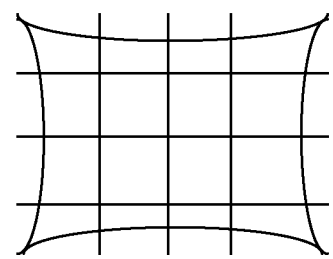
FIG. 10 illustrates a second embodiment of geometric distortions of an image.

FIG. 9 and FIG. 10 illustrate images 902 and 1002 respectively having geometric distortions. Geometric distortions may be caused by a number of factors including lens distortions and other distortions in the mechanical, optical and electrical components of an imaging system. In a particular embodiment, resampling of the geometrically distorted images can correct for geometric distortions.

Figure 11:
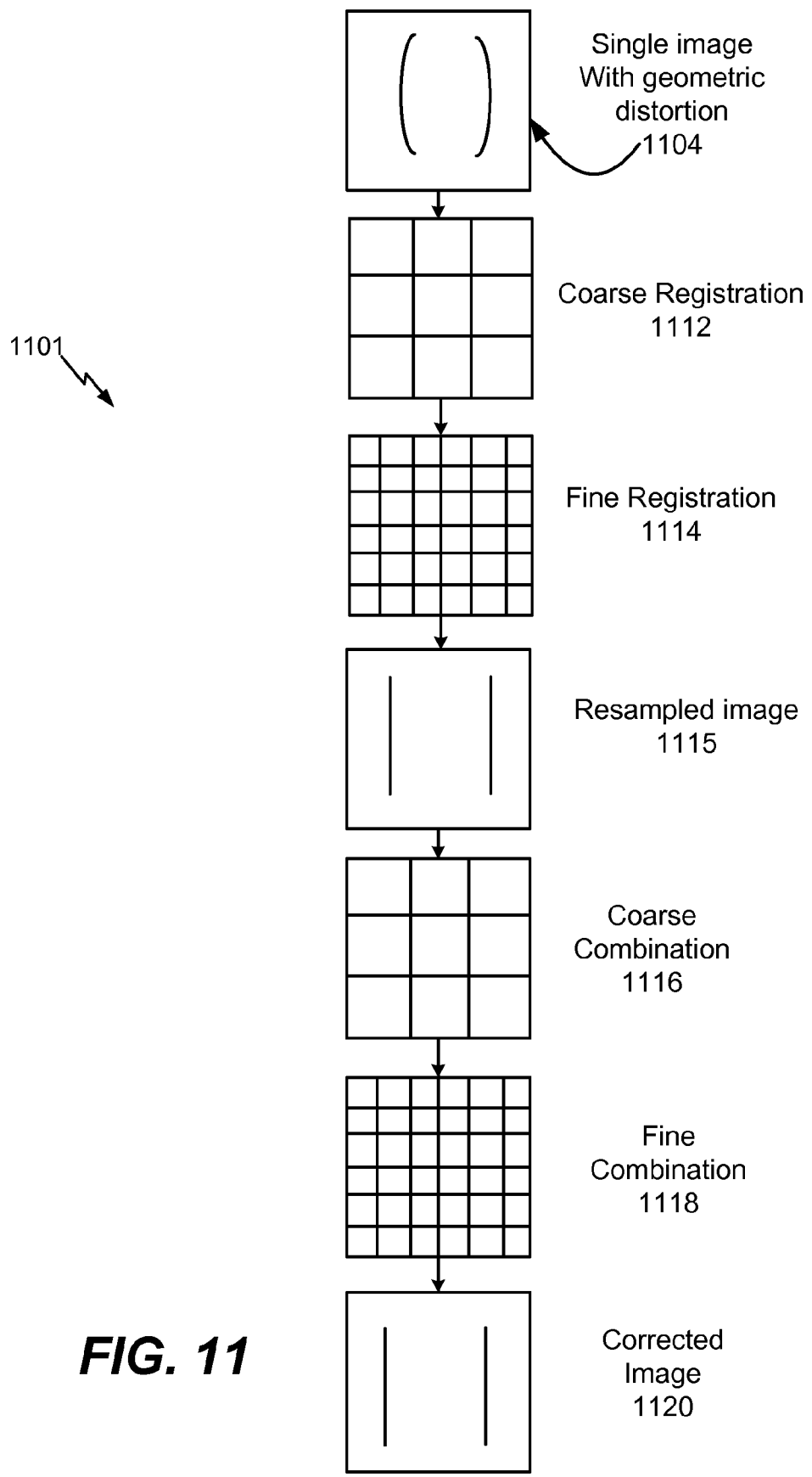
FIG. 11 is a diagram logically illustrating operation of an embodiment of an image combination engine providing for correction of geometric distortions of an image.

FIG. 11 is a block diagram logically illustrating operation of an embodiment of an image combination engine providing for correction of geometric distortions of an image. In FIG. 11, a single image with geometric distortions 1104 is provided as an input to a coarse registration process to produce a coarse registration image 1112. The coarse registration process may use a set of coarse registration vectors that may be predefined and based on known geometric distortions caused by mechanical, optical, and electrical components of the imaging system to make a coarse resampling of the image 1104.

A fine registration process may then use a set of fine registration vectors that may be predefined and based on known geometric distortions to make a fine resampling of the image 1104 to produce a fine registration image 1114. The resampled image 1115 is then provided to a course combination process producing a coarse combination image 1116 and a fine combination module producing a fine combination image 1118. In a particular embodiment, the image 1104 may also be combined with other images for other corrections providing a corrected image 1120.

In an illustrative embodiment, the data flow 1101 of an image to provide correction of geometric distortions of the image may be performed in the image combination module 118 of FIG. 1, the image combination engine 205 of FIG. 2, the image combination engine 305 of FIG. 3, the system 400 of FIG. 4, or any combination thereof. In a second illustrative embodiment, the data flow 1101 of an image to provide correction of geometric distortions of the image may be performed in accordance with the method of selective combination of images 1200 of FIG. 12, the hierarchical registration process 1300 of FIG. 13, the image improvement process 1400 of FIG. 14, or any combination thereof.

Figure 12:
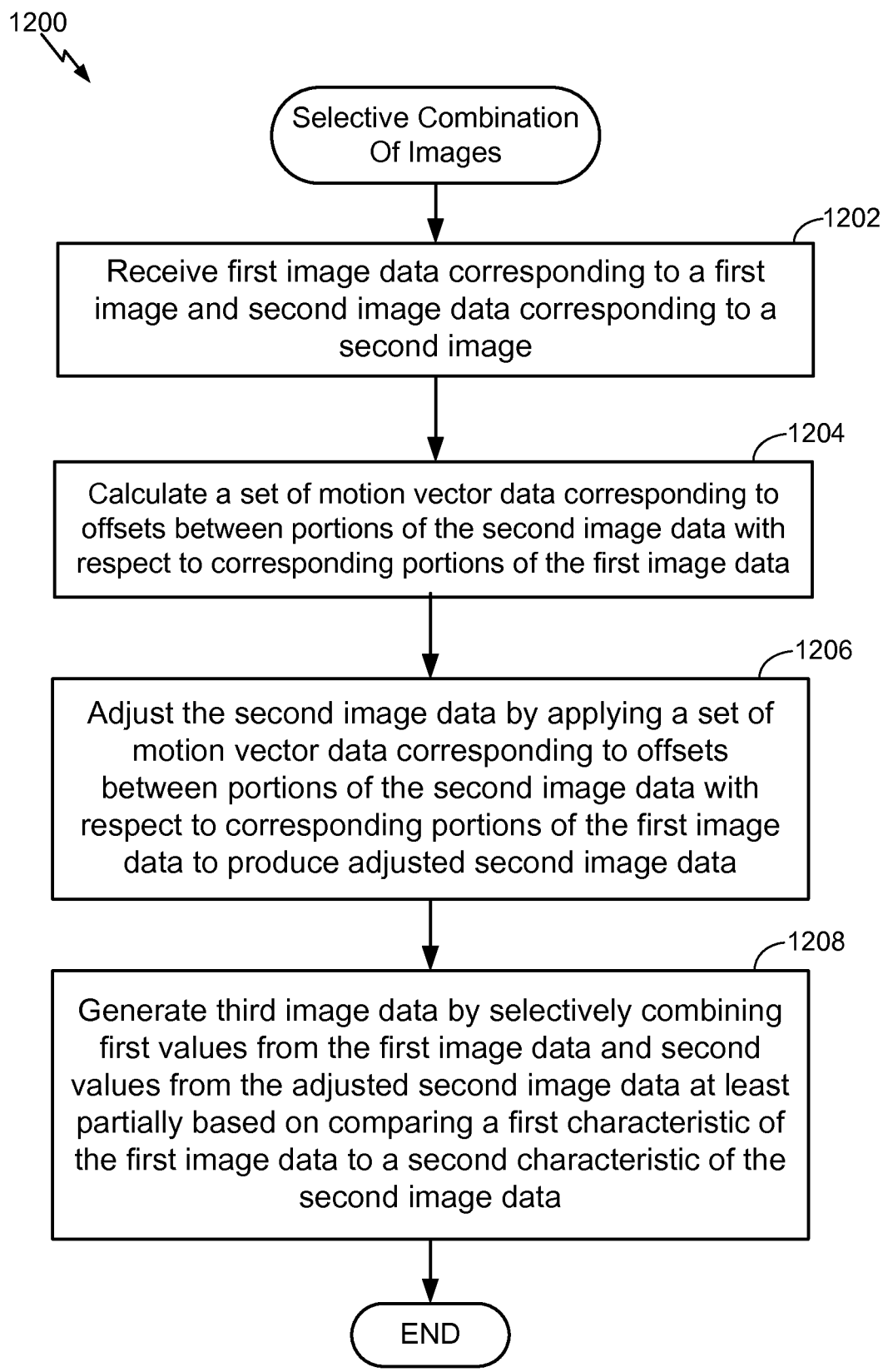
FIG. 12 is a flow diagram of a method of selectively combining images.

Turning to FIG. 12, a method of selective combination of images is generally shown at 1200. In an illustrative embodiment, the method 1200 may be performed by the image combining module 118 of FIG. 1, the image combination engine 205 of FIG. 2, the image combination engine 305 of FIG. 3, the system 400 of FIG. 4, or any combination thereof. First image data corresponding to a first image and second image data corresponding to a second image is received, at 1202. In a particular embodiment, the first image data and the second image data may be received in a color space having a luma component and a chroma component. In another particular embodiment, the first image data and second image data may be received in the YCbCr color space. A set of motion vector data may be calculated corresponding to offsets between portions of the second image data with respect to corresponding portions of the first image data, at 1204. For example, the set of motion vector data may be calculated using a coarse registration circuit to generate a first set of motion vectors to roughly align the image data and a fine registration circuit to generate a finer set of motion vectors based on the first set of motion vectors.

The second image data is adjusted by applying the set of motion vector data which, as described, corresponds to offsets between portions of the second image data with respect to corresponding portions of the first image data, at 1206. As a result, the second image data is adjusted to more closely align to the first image data, to compensate for movement of the camera or for movement of objects in the image between capturing the first image data and the second image data. Third image data is generated by selectively combining first values from the first image data and second values from the adjusted second image data at least partially based on comparing a first characteristic of the first image data to a second characteristic of the second image data, at 1208. Examples of characteristics that may be compared include focus of the images, contrast of the images, deviations between the luminance components of the images, and filtered characteristics of the images (e.g. low-pass filtered data, high-pass filtered data).

In a particular embodiment, the selective combining includes a coarse combining operation and a fine combining operation. The course combining operation may be performed on macroblocks of the adjusted second image data and the fine combining operation may be performed on pixels of the first image data and the second adjusted image data. The coarse combining operation may include selectively discarding one or more macroblocks of the adjusted second image data when a difference between the one or more macroblocks of the adjusted second image data and corresponding macroblocks of the first image data exceeds a selectable threshold value. For example the selectable threshold may be indicated by the threshold control signal 437 provided by the application specific control circuit 432 of FIG. 4. In another particular embodiment, the fine combining operation includes filtering the first image data and the adjusted second image data to compare filtered image characteristics, and the first values and second values are selectively combined based on the filtered image characteristics. The filtered image characteristics may be compared at the mean pixel difference circuit 474 of FIG. 4 and used to query the weighting table 434 to generate weights for a weighted combination of the first image data and the adjusted second image data.

In a particular embodiment, the first characteristics of the first image data and the second characteristic of the second image data are indicative of the focus condition of the images (e.g., in focus or out of focus), a movement of an object within the first image and the second image, or exposure of the images. In addition, in a particular embodiment, the values of the first and second image data may be combined based on comparing a filtered portion of the first image data with a filtered portion of the second image data. For example, the filtered portion of the first image data may be compared with the filtered portion of the second image data at the mean pixel difference circuit 474 of FIG. 4, and a result of the comparison may be used to determine a relative weight to be applied to the values of the first image data and the values of the second image data. The first image data and the second image data may be, for example, successive frames captured at an image sensor of a camera.

In certain embodiments, pixels or blocks of the first or second image data may be discarded and replaced with pixels or blocks from the other of the first or second image data when certain conditions are met. For example, pixels within macroblocks of the adjusted second image may be discarded when an image is adjusted for hand jitter or detection of motion. Pixels in the first image or in the adjusted second image may be discarded for depth of field enhancement. The resultant third image data may be enhanced over the first image or the second image for hand jitter, movement, depth of field enhancement, lateral chromatic aberrations and geometric distortions.

Figure 13:
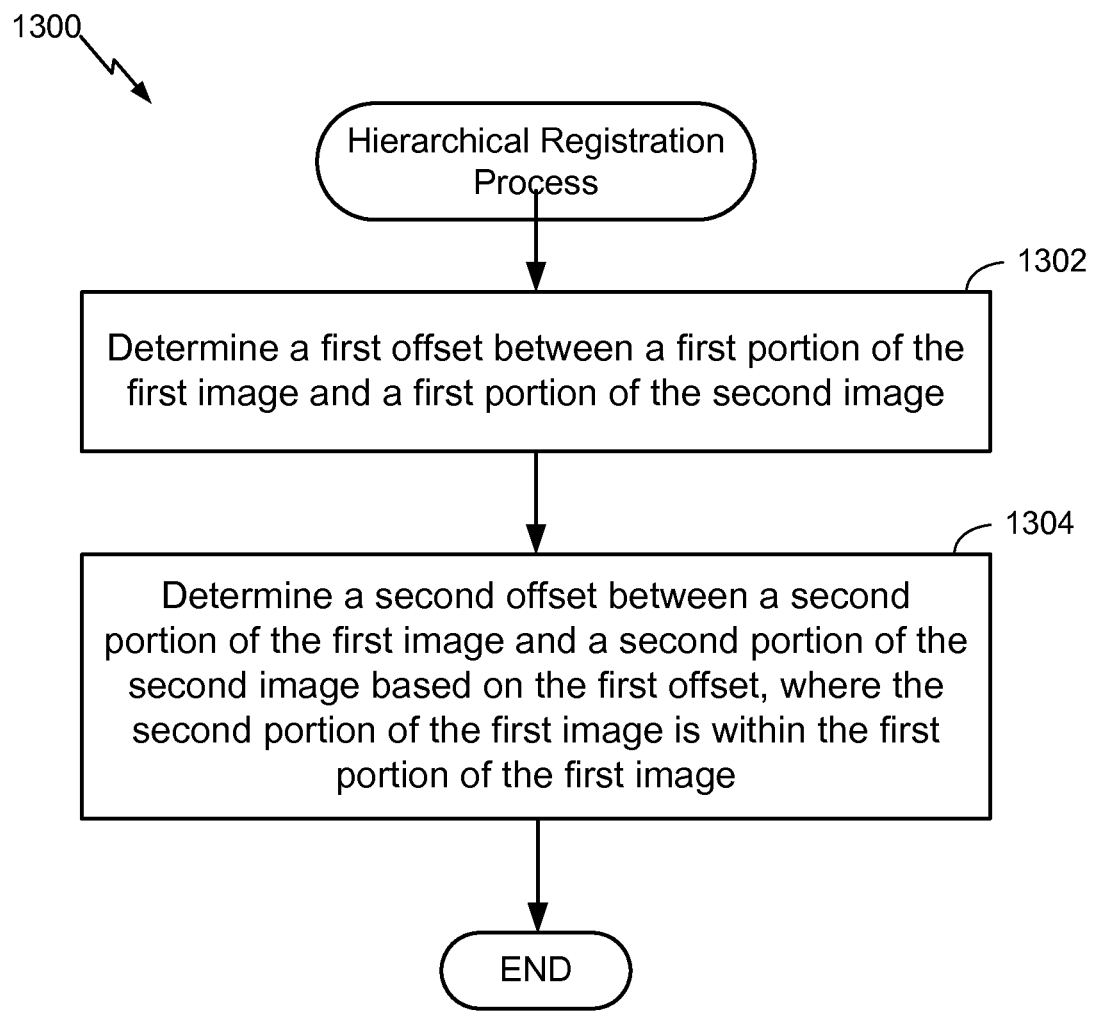
FIG. 13 is a flow diagram of a method of performing a hierarchical combination process.

In a particular embodiment, as illustrated by FIG. 13, the set of motion vector data is determined based on a hierarchical registration process 1300. The hierarchical registration process 1300 may be performed by the image combining module 118 of FIG. 1, the image combination engine 205 of FIG. 2, the image combination engine 305 of FIG. 3, the system 400 of FIG. 4, or any combination thereof. The hierarchical structure process provides the ability to adjust resolution versus robustness operating points and reduces computational demand. The hierarchical registration process 1300 includes determining a first alignment offset between a first portion of the first image and a first portion of the second image, at 1302, and determining a second alignment offset between a second portion of the first image and a second portion of the second image based on the first alignment offset, where the second portion of the first image is within the first portion of the first image, at 1304. In one particular embodiment, the first portion of the first image is one of nine divisions in a 3×3 matrix of the first image and the second portion of the first image corresponds to a sixteen-pixel-by-sixteen-pixel area of the first image.

Figure 14:
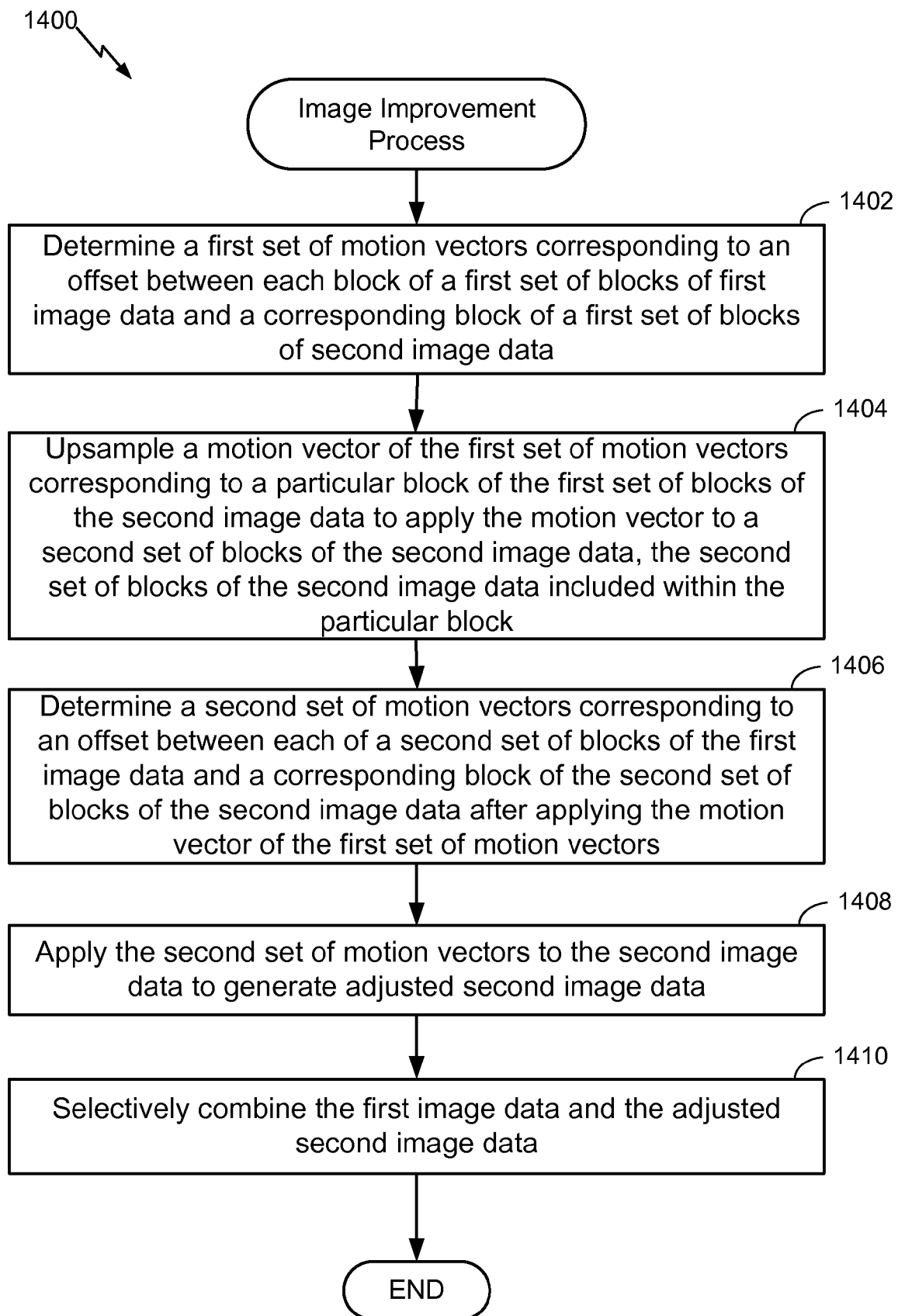
FIG. 14 is a flow diagram of a method of performing an image improvement process.

FIG. 14 depicts a flowchart that illustrates an embodiment of an image improvement method 1400. In an illustrative embodiment, the image improvement method 1400 can be performed by the image combining module 118 of FIG. 1, the image combination engine 205 of FIG. 2, the image combination engine 305 of FIG. 3, the system 400 of FIG. 4, or any combination thereof. A first set of motion vectors is determined corresponding to an offset between each block of a first set of blocks of first image data and a corresponding block of a first set of blocks of second image data, at 1402. For example, the first set of motion vectors may be the coarse set of motion vectors 427 of FIG. 4.

A motion vector of the first set of motion vectors corresponding to a particular block of the first set of blocks of the second image data is upsampled to apply the motion vector to a second set of blocks of the second image data, the second set of blocks of the second image data included within the particular block, at 1404. For example, the motion vector upsampling circuit 428 of FIG. 4 may upsample the motion vector of a particular block of a 3×3 set of overlapping blocks to a set of macro blocks within the particular block.

A second set of motion vectors corresponding to an offset between each of a second set of blocks of the first image data and a corresponding block of the second set of blocks of the second image data after applying the motion vector of the first set of motion vectors are determined, at 1406. For example, the second set of motion vectors may be the fine set of motion vectors 429 generated by the macro block refining circuit 430 of FIG. 4. The second set of motion vectors are applied to the second image data to generate adjusted second image data, at 1408.

In a particular embodiment, the second set of motion vectors are determined based on a selectable search range that is indicated via a control input, such as the input 326 of FIG. 3 or search range control signal 435 that is received at the macro block refining circuit 430 of FIG. 4. The selectable search range may limit the offset between each of the second set of blocks of the first image data and the corresponding block of the second set of blocks of the second image data after applying the motion vector of the first set of motion vectors.

Portions of the first image data and the adjusted second image data are selectively combined, at 1410. For example, the first image data and the second image data may be combined on a region-by-region or a pixel-by-pixel basis, or both. To illustrate, the first image data and the adjusted second image data may be combined by the hierarchical combination circuit 460 of FIG. 4.

In a particular embodiment, the selective combining of the first image data and the adjusted second image data produces third image data. The third image data may have a greater depth of field than the first image data, less noise than the first image data, or a greater dynamic resolution than the first image data.

Figure 15:
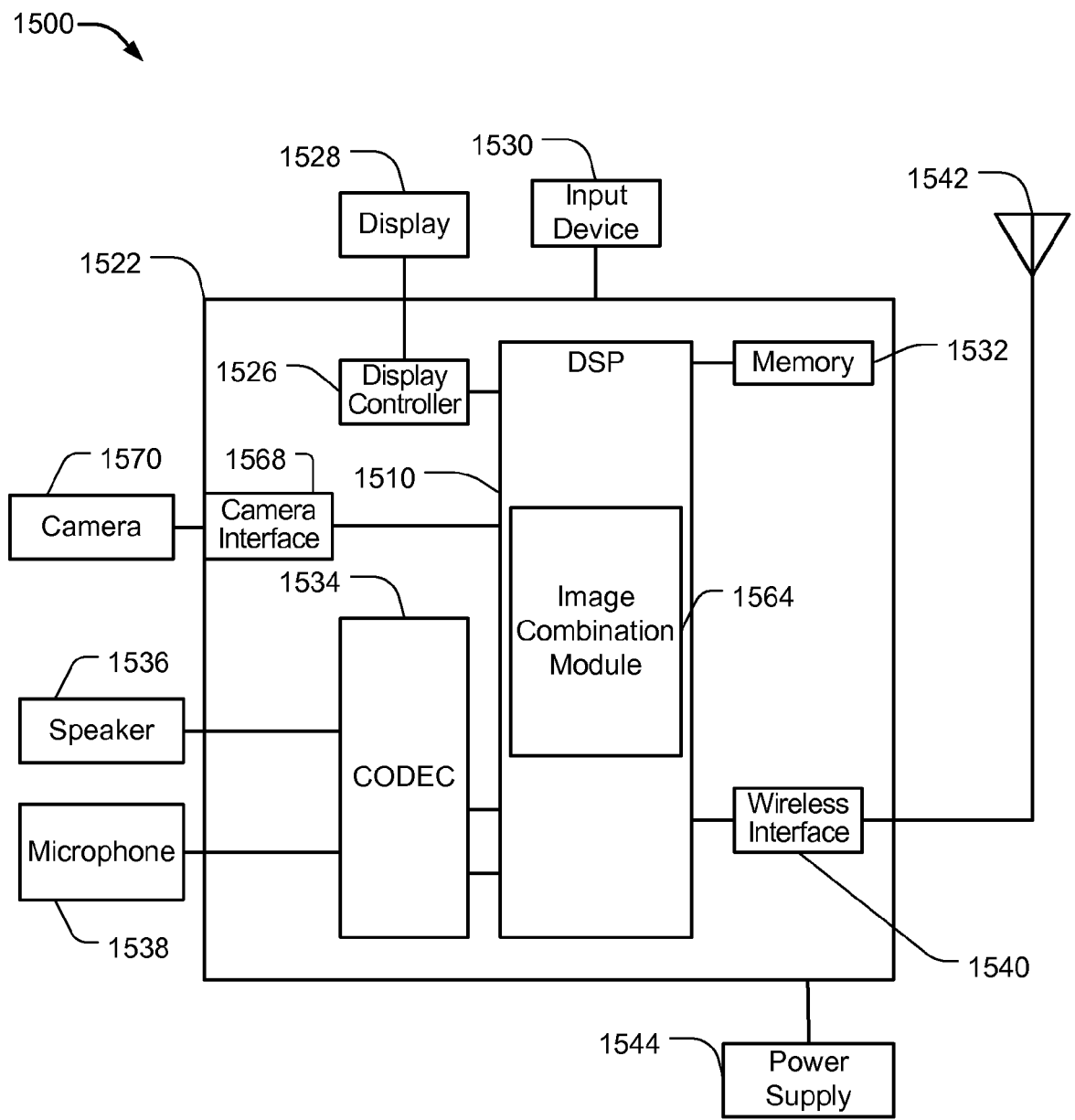
FIG. 15 is a block diagram of a portable electronic device including an image combination module.

FIG. 15 is a block diagram of particular embodiment of a system including a image combination module. The system 1500 may be implemented in a portable electronic device and includes a signal processor 1510, such as a digital signal processor (DSP), coupled to a memory 1532. The system 1500 includes an image combination module 1564. In an illustrative example, the image combination module 1564 includes any of the systems of FIGS. 1-5, operates in accordance with any of the methods of FIGS. 12-14, or any combination thereof. The image combination module 1564 may be incorporated into the signal processor 1510 or may be a separate device.

A camera interface 1568 is coupled to the signal processor 1510 and is also coupled to a camera, such as a camera 1570. The camera 1570 may be a video camera or a still image camera or may implement both functionalities. A display controller 1526 is coupled to the signal processor 1510 and to a display device 1528. A coder/decoder (CODEC) 1534 can also be coupled to the signal processor 1510. A speaker 1536 and a microphone 1538 can be coupled to the CODEC 1534. A wireless interface 1540 can be coupled to the signal processor 1510 and to a wireless antenna 1542.

In a particular embodiment, the signal processor 1510 includes the image combination module 1564 that is adapted to determine a first set of motion vectors corresponding to an offset between each block of a first set of blocks of first image data and a corresponding block of a first set of blocks of second image data. The image combination module 1564 may be adapted to upsample a motion vector of the first set of motion vectors corresponding to a particular block of the first set of blocks of the second image data to apply the motion vector to a second set of blocks of the second image data. The second set of blocks of the second image data are included within the particular block. The image combination module 1564 may be adapted to determine a second set of motion vectors corresponding to an offset between each of a second set of blocks of the first image data and a corresponding block of the second set of blocks of the second image data after applying the motion vector of the first set of motion vectors. The image combination module 1564 may be adapted to apply the second set of motion vectors to the second image data to generate adjusted second image data. The image combination module 1564 may be adapted to selectively combine portions of the first image data and the adjusted second image data to produce third image data.

For example, the image combination module 1564 may include the hierarchal registration circuit 420 of FIG. 4 including the motion vector upsampling circuit 428 to upsample a motion vector of the coarse set of motion vectors 427. The upsampled motion vector may correspond to a particular block of a 3×3 grid of blocks, and may be upsampled to each macro block within the particular block. The image combination module 1564 may also include the hierarchical combination circuit 460 of FIG. 4 to selectively combine the image data, such as at the coarse combination circuit 462 and at the fine combination circuit 464.

The signal processor 1510 may also be adapted to generate image data that has been processed by the image combination module 1564. The processed image data may include video data from the video camera 1570, image data from a wireless transmission via the wireless interface 1540, or from other sources such as an external device coupled via a universal serial bus (USB) interface (not shown), as illustrative, non-limiting examples.

The display controller 1526 is configured to receive the processed image data and to provide the processed image data to the display device 1528. In addition, the memory 1532 may be configured to receive and to store the processed image data, and the wireless interface 1540 may be configured to receive the processed image data for transmission via the antenna 1542.

In a particular embodiment, the signal processor 1510, the display controller 1526, the memory 1532, the CODEC 1534, the wireless interface 1540, and the camera interface 1568 are included in a system-in-package or system-on-chip device 1522. In a particular embodiment, an input device 1530 and a power supply 1544 are coupled to the system-on-chip device 1522. Moreover, in a particular embodiment, as illustrated in FIG. 15, the display device 1528, the input device 1530, the speaker 1536, the microphone 1538, the wireless antenna 1542, the video camera 1570, and the power supply 1544 are external to the system-on-chip device 1522. However, each of the display device 1528, the input device 1530, the speaker 1536, the microphone 15315, the wireless antenna 1542, the video camera 1570, and the power supply 1544 can be coupled to a component of the system-on-chip device 1522, such as an interface or a controller.

In a particular embodiment, the system 1500 may function as a personal digital assistant ("PDA"), a cellular telephone or similar device. The system 1500 may be adapted to provide for user controllable input, such as through input device 1530, and may include a control circuit to control the control image combination module 1564 and to receive the user controllable input.

Those of skill would further appreciate that the various illustrative logical blocks, configurations, modules, circuits, and algorithm steps described in connection with the embodiments disclosed herein may be implemented as electronic hardware, computer software, or combinations of both. To clearly illustrate this interchangeability of hardware and software, various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable any person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A system to selectively combine multiple images, comprising:
    an application specific control circuit;
    a hierarchical registration circuit; and
    a hierarchical combination circuit, comprising:
        a course combining circuit, and
        a fine combining circuit, comprising:
            a first filter and a second filter, the first filter and second filter being responsive to an input provided by the application specific control circuit, the input configured to indicate a filter response characteristic;
            a mean pixel MS difference circuit, configured to perform a pixel by pixel difference operation,
            an image combining circuit coupled to the mean pixel MS difference circuit,
            wherein the first filter is configured to filter first image data and provide first filtered image data to the mean pixel MS difference circuit,
            wherein the second filter is configured to filter second image data and provide second filtered image data to the mean pixel MS difference circuit.

2. The system of claim 1, wherein the image combining circuit is configured to receive a difference value from the mean pixel MS difference circuit and to determine a pixel value of each pixel in an output image.

3. The system of claim 2, wherein the application specific control circuit and the image combining circuit are also coupled to a weighting table.

4. The system of claim 3, wherein the image combining circuit is configured to receive a difference value from the mean pixel MS difference circuit and to determine a pixel value for each pixel in an output image based on the weighting table and the difference value.

5. The system of claim 4, wherein the image combining circuit is configured to lookup a weight in the weighting table based on the difference value.

6. The system of claim 5, wherein the image combining circuit is configured to apply a first weight provided by the weighting table to a pixel value of the first received image data and a second weight provided by the weighting table to be applied to a pixel value of the second received image data.

7. The system of claim 5, wherein the image combining circuit is configured to apply a weight W provided by the weighing table to the first received image data, and a weight of 1−W to a pixel value of the second received image data.

8. The system of claim 1, wherein the mean pixel MS difference circuit is configured to perform a pixel by pixel signed mean square difference operation.

9. The system of claim 8, wherein the difference operation generates a signed value indicating a difference between the first filtered image data and the second filtered image data, for each pixel in the first and second image data, based at least on the luma and chroma values for the each pixel.

10. The system of claim 1, wherein the filter characteristic indicates one of a low-pass response, a high-pass response, a bandpass response, or any combination thereof.

11. The system of claim 1, wherein the application specific control circuit indicates a type of filtering to be performed by the first filter and the second filter, and indicates a weighting of how the first image data and the second image data are to be combined by the image combination circuit based on a filtered pixel difference between the first image data and the
second image data, wherein the filtered pixel difference is provided by the mean pixel MS difference circuit.

12. A method of selectively combining multiple images, comprising:
    receiving, into a fine combination circuit, first and second image data;
    filtering, with the fine combination circuit, the first and second image data based on a filter response characteristic,
    generating a mean pixel difference based on a signed mean square difference of the first and second filtered image data; and
    determining, with the fine combination circuit, an output image pixel value based on the difference.

13. The method of claim 12, wherein the output image pixel is further determined based on a weighted value of the first image data and a weighted value of the second image data.

14. The method of claim 13, wherein the weighted values are based on the difference value.

15. The method of claim 14, wherein the weighted values are further based on input from an application specific control circuit.

16. The method of claim 12, wherein the filter response characteristic is one of a low-pass response, a high-pass response, a bandpass response, or any combination thereof.

17. The method of claim 12, wherein the filter response characteristic is indicated by a control signal provided by an application control circuit.

18. A system for selectively combining multiple images, comprising:
    means for receiving first and second image data into a fine combination circuit;
    means for filtering the first and second image data with the fine combination circuit based on a filter response characteristic,
    means for generating a mean pixel difference based on a signed mean square difference of the first and second filtered image data; and
    means for determining an output image pixel value based on the difference with the fine combination circuit.

19. The system of claim 18, wherein the means for determining an output image pixel value is configured to receive a difference value from the means for generating a mean pixel difference and to determine a pixel value of each pixel in an output image.

20. The system of claim 18, wherein the filter response characteristic is indicated by a control signal provided by an application control circuit.

* * * * *